July 21, 1931.   O. F. JEGLUM ET AL   1,815,150
DETACHABLE SPADE LUG FOR TRACTORS
Filed Feb. 15, 1930
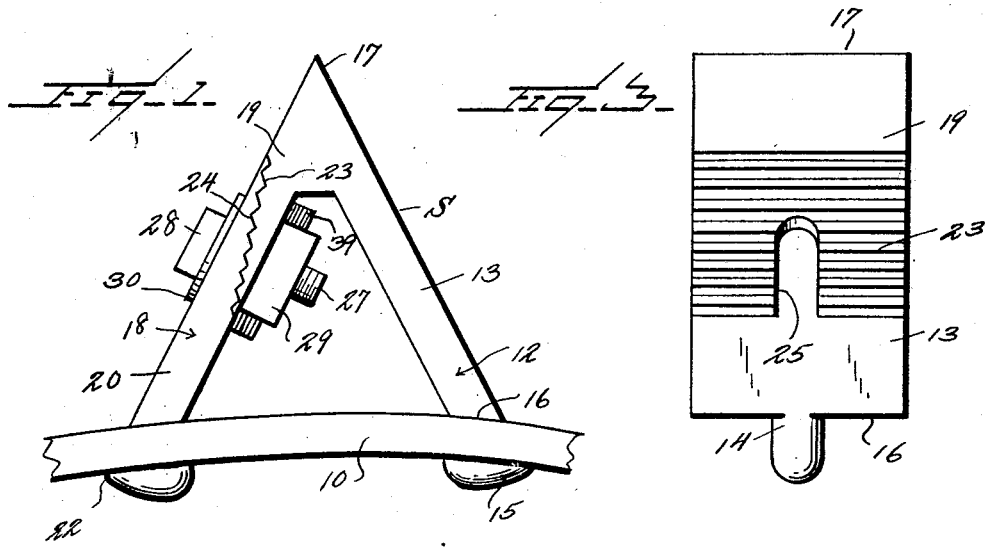
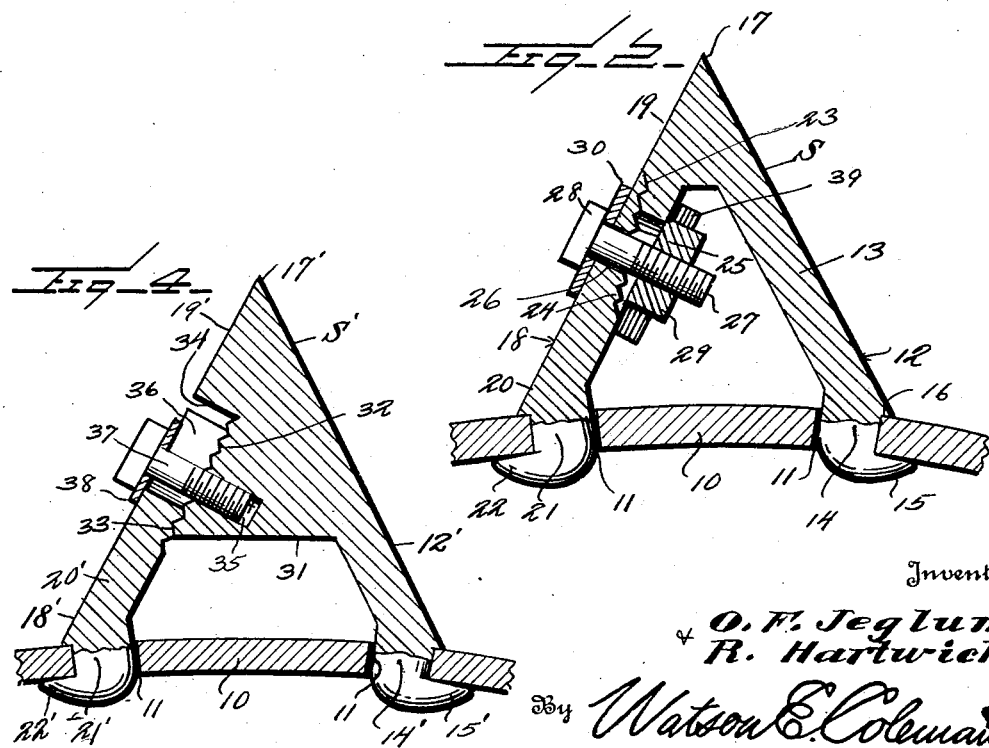
Inventors
O. F. Jeglum
R. Hartwick
By Watson E. Coleman
Attorney Patented July 21, 1931

1,815,150

UNITED STATES PATENT OFFICE

OLE F. JEGLUM, OF MALTA, AND RICHARD E. HARTWICK, OF REGINA, MONTANA; SAID HARTWICK ASSIGNOR TO RAY N. RUDE, OF MALTA, MONTANA

DETACHABLE SPADE LUG FOR TRACTORS

Application filed February 15, 1930. Serial No. 428,710.

The present invention relates to tractor spade lugs and more particularly to tractor spade lugs of the detachable type.

An object of this invention is to provide a detachable spade lug which may be readily mounted on the drive wheel of a tractor and which may be removed therefrom with the minimum of effort and in an exceedingly short space of time so as not to unduly delay the tractor when it is necessary to move the same over a hard surfaced road where use of spade lugs of this type is prohibited.

Another object of this invention is to provide a spade lug which is strong and which may be adapted for use with the various types of tractors at present available.

A further object of this invention is to provide a detachable spade lug wherein the securing member is protected from stones or the like, which have a tendency to injure the securing member and prevent removal of the spade.

The above and various other objects and advantages of this invention will in part be described and in part be understood from the following detailed description of the present preferred embodiment, the same being illustrated in the accompanying drawings wherein:—

Fig. 1 is a detail side elevation of a preferred embodiment of this invention;

Fig. 2 is a transverse section partly in elevation of the device;

Fig. 3 is a rear elevation of the front member; and

Fig. 4 is a transverse section, partly in elevation of a modification of the invention.

Referring to the drawings wherein like numerals of reference designate corresponding parts throughout the several views, the numeral 10 designates a tractor drive wheel, the rim portion of which is provided with a plurality of spaced openings 11.

The tractor drive wheel 10 is adapted to have detachably mounted thereon a spade lug designated generally by the reference character S; this spade lug comprises front and rear members 12 and 18 respectively. The spade lug member 12 is provided with an angularly inclined front portion 13 which is provided at the lower end thereof with a depending lug 14 which is adapted to loosely engage a selected opening 11 in the rim of the tractor drive wheel.

The lug 14 is preferably provided with an outstanding flange or lug 15 at the lower end thereof, which is adapted to frictionally engage the inner face of the rim 10 when the lug has been inserted in the selected opening 11.

The lower edge portion of the front 13 is preferably angularly formed as at 16 so as to lie upon the periphery of the rim 10. The spade lug member 12 is adapted to extend upwardly from the rim 10, the front portion 13 extending rearwardly at an angle, and is provided at the outer end thereof with a substantially pointed portion 17 which is adapted to engage the ground or other surface over which the tractor is moving.

The rear portion or face 18 of the spade lug S is preferably constructed in two parts, the upper portion 19 thereof being integral with the front face 13 end extending downwardly at a substantially sharp angle therefrom. The lower member 20 of the rear face is provided with a depending lug 21 which is adapted to extend into a selected opening 11 in the rim 10 and, similar to the lug 14, is provided with an outstanding shank or lug 22 for engaging the inner face of the rim 10.

The upper portion 19 of the rear face 18 is provided with a toothed or serrated portion 23 at a point spaced downwardly from the upper end thereof and extending angularly from the outer face to the inner face.

The lower member 20 of the rear face is provided with a complementary serrated or toothed portion 24, and extends outwardly at an inclined angle to the outer face of the lower member 20, and is adapted to register with the serrated portion 23 of the upper portion 19 of the rear face 18.

The upper portion 19 of the rear face 18 is preferably provided with an elongated slot 25 which is open at the lower end thereof, and the lower rear member 20 is provided with an opening 26 for receiving a securing bolt 27 or the like.

The head portion 28 of the bolt 27 is adapted to engage the outer face portion of the lower rear member 20, and the threaded inner portion of the bolt is adapted to receive a securing nut 29 or the like. The bolt 27 is adapted to securely hold the upper member 19 and the lower member 20 together, and a locking washer 30 or the like may be interposed between the head 28 and the outer face of the upper rear member 19 so as to lock the bolt 28 on the spade lug S.

When the bolt 27 has been securely mounted on the rear face of the spade lug, the lugs 14 and 21 with the outstanding members 15 and 22 respectively, will securely hold the spade lug on the periphery of the drive wheel. When it is desired to remove the spade from the drive wheel, the bolt 27 may be loosened slightly so that the toothed portions of the upper and lower portions of the rear member may be moved out of register, whereupon the front portion may be swung forwardly, the upper rear portion 19 of the rear face 15 moving upwardly and away from the lower rear portion 20 thereby permitting the removal of the spade lug from the rim of the wheel.

In the modification disclosed in Fig. 4, the front portion 12' of the spade lug is S' is provided with a body or inner portion 31. The rear face of the body 31 is serrated as at 32, the serrated or toothed portion thereof extending inwardly from the upper rear face 19' of the rear face 18', and the lower rear member 20' is provided along the inner face thereof adjacent the upper end portion with a complementary serrated or toothed portion 33 which is adapted to register with the serrated portion 32.

The member 19' is provided with a seat or the like 34 at the lower end thereof against which the upper edge portion of the rear member 20' is adapted to engage. The body portion 31 is preferably provided with a threaded opening 35 and the lower rear member 20' may be provided with a slotted opening 36 which is preferably open at the upper end thereof.

A threaded bolt 37 or the like is adapted to extend through the slot 36 and into the threaded opening 35 so as to secure the two portions of the rear member together.

If desired, a washer 38 or the like may be interposed between the head of the bolt 37 and the lower member 20. As in the preferred embodiment of this invention, when it is desired to remove the spade lug S from the rim 10 of the tractor, the bolt 37 may be loosened slightly so as to permit the serrated portions 32 and 33 to move out of register with one another, whereupon the front portion 12' may be swung forwardly, the bolt moving upwardly through the open end of the slot 36, thereby permitting the lug 14' of the front member and the lug 21' of the rear member to be drawn out of the openings 11 in the rim.

In order to facilitate ready removal of the bolt 27 the inner face portion of the member 19 may be provided with an outstanding locking bar 39 which is adapted to engage against one edge portion of the nut 29 so as to prevent turning thereof.

As shown in the drawings, the upper portion of the spade is preferably constructed in triangular form so as to provide a substantially sharp outer end portion 17, but it is of course understood that where desired, the outer end portion of the spade may be provided with any other suitable configuration.

It may also be understood that various changes and modifications may be made in the details of construction and design of the above specifically described embodiment of the invention without departing from the spirit thereof, such changes and modifications being restricted only by the scope of the following claims.

What is claimed is:—

1. A detachable spade lug adapted to be removably mounted on the rim of a tractor drive wheel comprising a pair of spade members, depending lugs secured to said members and adapted to rest in said rim, outstanding extensions secured to said lugs and engaging the inner face of the rim, and means for detachably securing said spade members to each other.

2. A spade lug adapted to be removably mounted on the rim of a tractor drive wheel having spaced openings therethrough, comprising front and rear outstanding members, depending securing lugs secured to said members at the lower edge portions thereof and adapted to removably engage the openings in said rim, and means for detachably securing said members to each other, said securing lugs having outwardly extending rim engaging portions whereby to detachably hold said front and rear members on the rim against outward movement.

3. A detachable spade lug adapted to be mounted on the rim of a tractor drive wheel, said rim having a plurality of spaced openings therethrough, comprising front and rear spade members outstanding from said rim, means on the lower edge portions of said front and rear members for detachably securing said members in the openings in said rim, said securing means engaging the inner face of the rim whereby to hold the members against outward movement, said front member having a rearwardly extending portion, said rear member and said rearwardly extending portion of said front member having serrated faces, and means In testimony wherof we hereunto affix gether.

4. A detachable spade lug adapted to be removably mounted on the rim of a tractor drive wheel having spaced openings therethrough, comprising a front member angularly inclined from the periphery of said drive wheel, a rear member angularly inclined from said drive wheel and adapted to engage said front member whereby to form a substantially triangular spade lug, said front member having a rearwardly extending slotted portion, said rear member and said rearwardly extending portion of said front member having registering serrated surfaces, said rear member having an opening therethrough, a securing bolt adapted to pass through said openings and hold said members together, and depending lugs secured to the lower edge portions of said front and rear members and adapted to removably engage the openings in said rim, said lugs having outstanding flange portions whereby to engage the inner face of the rim.

5. A detachable spade lug adapted to be removably mounted on the rim of a tractor drive wheel, said rim being provided with a plurality of spaced openings therethrough, said spade lug comprising a front member including a body portion, a front portion secured to said body portion and angularly inclined from said rim, said body portion being provided with a serrated rear face positioned downwardly from the outer end of said body portion, said body portion also being provided with an inwardly extending seat, a rear member adapted to engage said seat of said body portion, said rear member being provided with a serrated portion registering with said serrated rear face, said rear member also having a slotted opening extending downwardly from the upper edge portion thereof, said body portion having a threaded opening through its serrated portion, securing means for holding said rear member against said body portion, and a plurality of depending lugs secured to said front and rear members for detachably mounting the spade lug on the rim of the wheel, said depending lugs being adapted to extend through said openings in the rim and being provided with outwardly extending flanges whereby to lock the lugs on the rim.

In testimony whereof we hereunto affix our signatures.

OLE F. JEGLUM.
RICHARD E. HARTWICK.